Oct. 11, 1966    P. D. COREY ETAL    3,278,827
STATIC INVERTER
Filed June 13, 1962    3 Sheets-Sheet 1

INVENTORS
PHILIP D. COREY
ARMISTEAD L. WELLFORD
BY
Isidore Match
ATTORNEY

INVENTORS
PHILIP D. COREY
ARMISTEAD L. WELLFORD
BY
*Isidore Match*
ATTORNEY

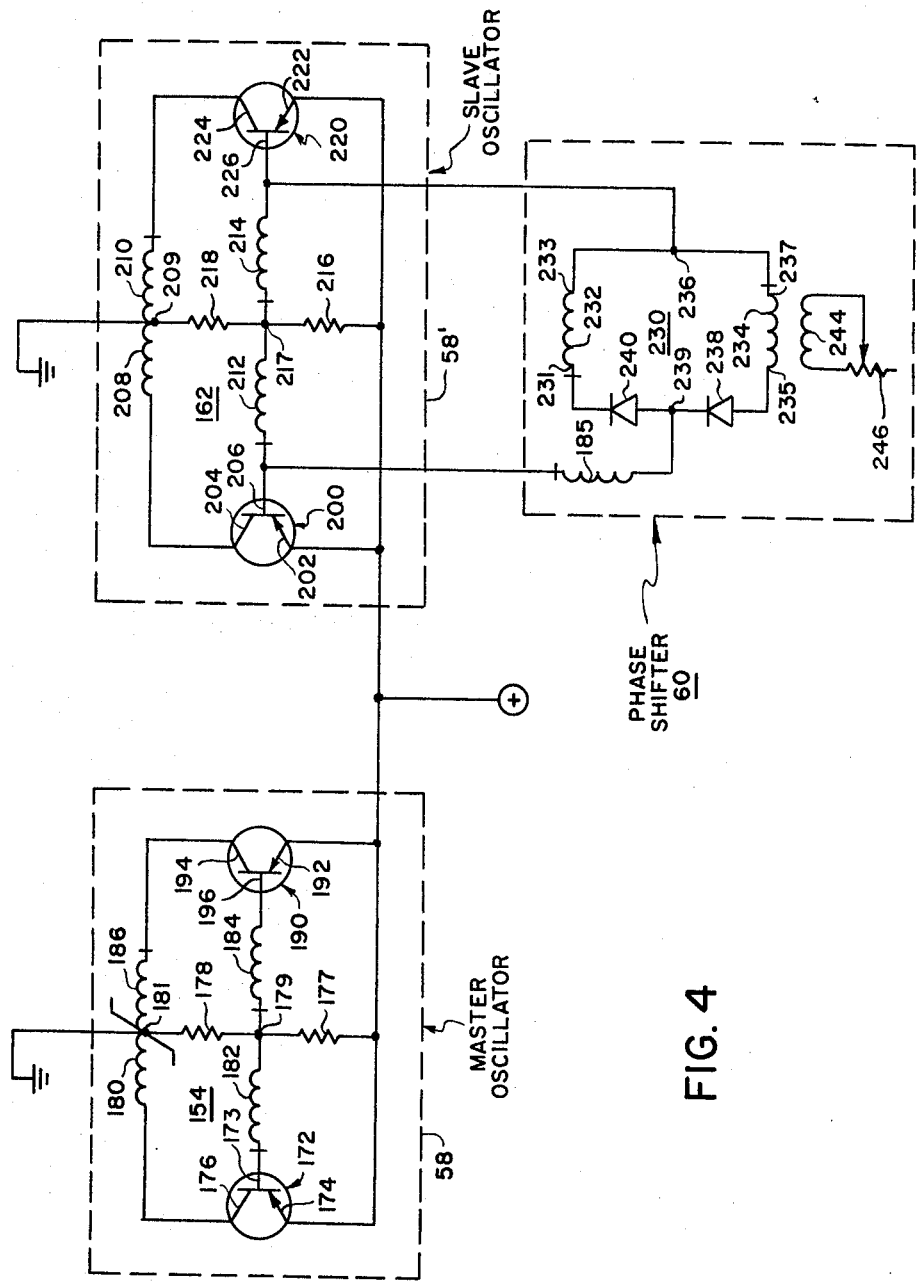

3,278,827
STATIC INVERTER
Philip D. Corey and Armistead L. Wellford, Waynesboro, Va., assignors to General Electric Company, a corporation of New York
Filed June 13, 1962, Ser. No. 202,242
16 Claims. (Cl. 321—44)

This invention relates to static inverters. More particularly, it relates to static inverters utilizing silicon controlled rectifiers as the switching elements therein.

In static inverters embodying silicon controlled rectifiers as the switching elements therein, one of the most pressing problems that is encountered is the effecting of reliable commutation, that is the rendering nonconductive of the presently conducting silicon controlled rectifier when its complementary silicon controlled rectifier is gated into conductivity.

Heretofore, in known static inverter circuits, the commutating capacitor in such circuits has had to have a capacitance value which, in addition to enabling it to carry peak load current, also has permitted it to correct for lagging power factor loads, i.e., inductive loads. Also, the silicon controlled rectifiers that have been utilized have had to have ratings far in excess of the peak D.C. supply voltage to enable their handling of high voltage transients and spikes. Further, in such known circuits, there have had to be included a large amount of circuit elements to assure voltage regulation, voltage transient suppression, etc.

It is, accordingly, an important object of this invention to provide a simple static inverter circuit utilizing silicon controlled rectifiers as the switching elements therein wheren reliable commutation is accomplished.

It is a further object to provide a static inverter in accordance with the preceding object wherein there is utilized substantially a minimum of electrical components and wherein such components need not have ratings exceding the peak D.C. supply voltage.

Generally speaking and in accordance with the invention, there is provided a circuit for converting the output of a D.C. source to an A.C. output comprising a series arrangement of first and second gate controlled rectifiers having a center-tapped inductor disposed therebetween the series arrangement being connected across the source. First and second capacitors are included connected across the first silicon controlled rectifier and one half of the inductor, and the second silicon controlled rectifier and the other half of the inductor respectively. Signal generating means are provided to gate the gate controlled rectifiers into conductivity at alternate half cycles of output from the signal generating means whereby at the time that one of the gate controlled rectifiers is rendered conductive, twice the D.C. source voltage appears across the inductor due to autotransformer action and in a polarity to render the previously conducting gate controlled rectifier nonconductive.

The novel features, which are believed to be characteristic of this invention, are set forth with particularly in the appended claims. The invention itself, however, both as to its organization and method of operation together with further objects and advantages thereof may best be understood by reference to the following description taken in connection with the accompanying drawings.

In the drawings, FIG. 1 is a schematic depiction of an illustrative embodiment of the invention;

FIG. 4 is a schematic diagram of an arrangement for effecting voltage regulation in the system of FIG. 3.

Figure 1:
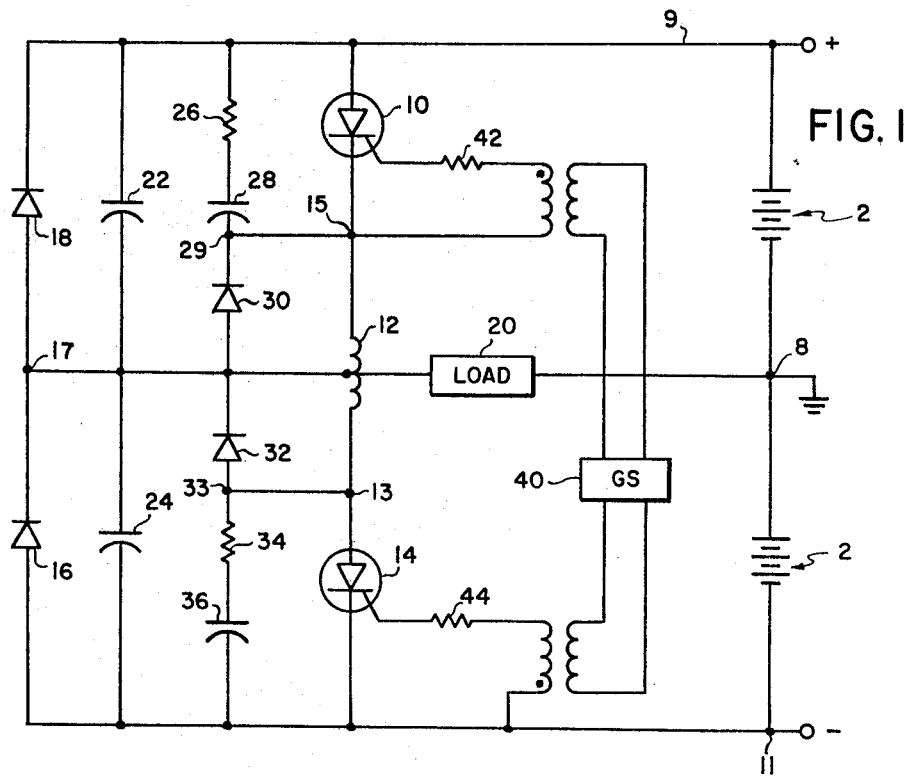

Referring now to FIG. 1, there is shown connected across the D.C. supply source, 2, the series arrangement of the anode to cathode path of a first silicon controlled rectifier 10, an inductor 12, and the anode to cathode path of a second silicon controlled rectifier 14. Also, connected across the D.C. supply source is the series arrangement of the cathode to anode paths of diodes 16 and 18 which permit the return of energy to the D.C. source in conditions such as those of lagging power factor loads, i.e., inductive loads, when circulating reactive currents are present. Such diodes are often referred to as "pump-back" diodes. Inductor 12 is center-tapped and the junction 17 of diodes 16 and 18 and the center point of inductor 12 is connected to the circuit load 20.

Connected between the positive terminal 9 of the D.C. supply source and junction 17 is a capacitor 22 and connected between junction 17 and the negative terminal 11 of the source is a capacitor 24.

Also connected between positive terminal 9 and junction 17 is the series arrangement of a resistor 26, a capacitor 28 and the cathode to anode path of a diode 30 and connected between junction 17 and negative terminal 11 is the series arrangement of the cathode to anode path of a diode 32, a resistor 34 and a capacitor 36. The junction 29 of capacitor 28 and the cathode of diode 30 is connected to the junction 15 of the cathode of silicon controlled rectifier 10 and inductor 12 and the junction 33 of the anode of diode 32 and resistor 34 is connected to the junction 13 of inductor 12 and the anode of silicon controlled rectifier 14. A gating source 40 which may suitably be a multivibrator provides gating pulses to the gate electrodes of silicon controlled rectifiers 10 and 14 through its output transformer, the series arrangement of a current limiting registor 42 and a secondary winding of the gating source output transformer being connected between the cathode and gate electrode of silicon controlled rectifier 10 and the series arrangement of another secondary winding and a current limiting resistor 44 being connected between the cathode and gate electrode of silicon controlled rectifier 14. It is seen from the polarity dot designations on the secondary windings that silicon controlled rectifiers 10 and 14 are gated into conductivity at successive half cycles of output from gating source 40.

In considering the operation of the circuit of FIG. 1 let it be assumed that silicon controlled rectifier 10 is gated into conductivity by the half cycle of output of source 40. With silicon controlled rectifier 10 conducting, load current flows from positive terminal 9 through silicon controlled rectifier 10, the "upper" half of inductor 12 and load 20 to supply center tap 8 to ground. During the half cycle that silicon controlled rectifier 10 is conductive, side 17 of commutating capacitor 24 charges to the potential of positive terminal 9. At the end of the half cycle of operation, silicon controlled rectifier 14 is gated into conductivity and gating current is simultaneously removed from silicon controlled rectifier 10. At the instant that silicon controlled rectifier 14 is rendered conductive, the full voltage across capacitor 24 appears across the "lower" half of inductor 12 thus forcing the voltage across the lower half of inductor 12 to be instantaneously equal to the D.C. supply voltage. Because of autotransformer action between the upper and lower halves of center-tapped inductor 12, instantaneously the voltage across the entire winding of inductor 12 will equal twice the D.C. supply voltage. Consequently, the anode to cathode voltage across silicon controlled rectifier 10 is reversed and silicon controlled rectifier 10 is commutated into nonconductivity.

Now on the succeeding half cylces, i.e., when silicon controlled rectifier 14 is gated into conductivity, capacitor 22 charges similarly and when silicon controlled rectifier 10 is again gated into conductivity, the same commutation events ensue as when silicon controlled rectifier 14 was rendered conductive at the beginning of the immediately preceding half cycle. Of course, during the half cycle that silicon controlled rectifier 14 conducts, capacitor 24 becomes discharged and during the half cycle that silicon controlled rectifier 10 conducts, capacitor 22 becomes discharged.

As has been previously stated, diodes 16 and 18 enable the return of energy from the load circuit to the D.C. supply which is necessary to enable the inverter to carry reactive loads. Diodes 30 and 32 and connected across the commutating inductor 12 in order to clamp the voltage across the inductor and thereby prevent any voltage overshoot which might otherwise require the use of higher rated diodes and higher rated silicon controlled rectifiers in the circuit. The respective series arrangements of resistor 26 and capacitor 28 and resistor 34 and capacitor 36 are connected across silicon controlled rectifiers 10 and 14 in order to absorb any energy in the small leakage inductance of inductor 12 after rectifier reverse current has suddenly ceased flowing.

It is seen from the above that in accordance with the invention, there is presented a simple static inverter circuit. With this circuit, given silicon controlled rectifier turn-off time requirements and peak load current, optimum commutating inductor and capacitor values can be immediately computed. This circuit presents many further advantages as are detailed below:

(1) The linear commutating inductor is nonsaturating and, therefore, inherently acoustically quit. This is an important consideration where low noise is a desired quality.
(2) The commutating capacitors 22 and 24 are proportionally sized to carry the peak load current at the instant of commutation. Their capacitance value need not be chosen to correct for the value of the reactive load.
(3) The autocommutation arrangement of the circuit requires a minimum of circuit components and is conveniently utilizable with pulse-width modulated inverter applications as well as phasor addition arrangements of voltage regulation.
(4) The peak instantaneous voltage across the silicon controlled rectifiers as well as the other semiconductor elements in the circuit is strictly limited to the peak D.C. supply voltage. This enables the use of silicon controlled rectifiers rated at just the peak voltage of the D.C. supply with the consequent economy flowing therefrom.
(5) The impedance of commutating inductor 12 is such as to limit the reverse current in the silicon controlled rectifiers to safe levels without the need for further circuit components.
(6) The voltage across commutating capacitors 22 and 24 is unidirectional, thereby permitting the use of polarized capacitors in this arrangement. This enables the use of relatively cheap capacitors where low cost is a factor.
(7) Commutating capacitors 22 and 24 provide a dual function in the circuit in that they provide load current commutation and also additional filtering of the D.C. power supply. In this regard, it is to be noted that the commutating capacitors are connected across the D.C. supply and thus function as filter elements to aid in removing ripple and "spikes" from the D.C. voltage.

Figure 2:
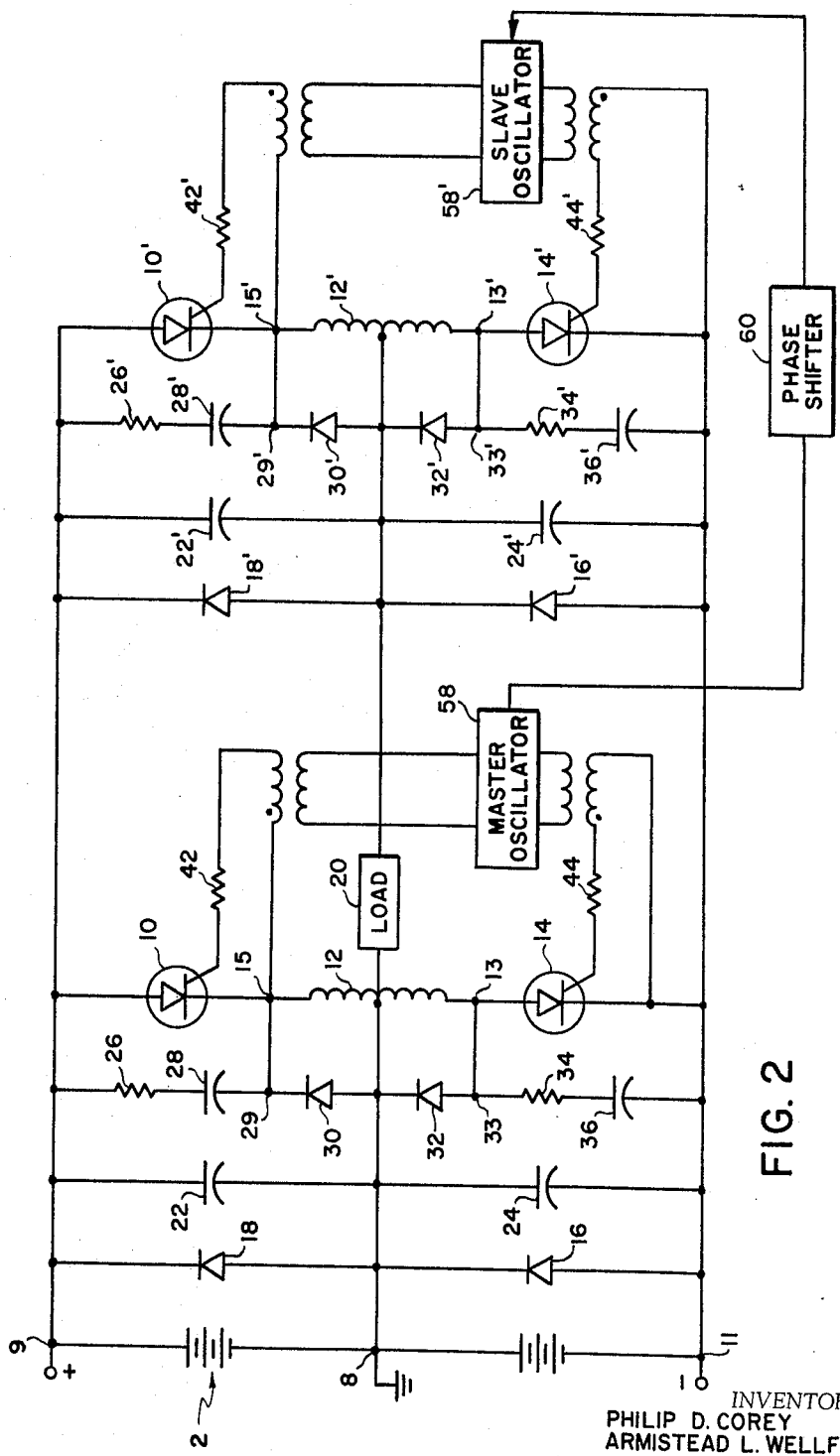
FIG. 2 is a schematic diagram of another embodiment of the invention.

Referring now to FIG. 2, there is shown an embodiment employing two of the inverters depicted in FIG. 1. Since the elements of each inverter in FIG. 2 is the same as corresponding elements in the inverter of FIG. 1, the same designating numerals have been utilized, the numerals of one of the inverters of FIG. 2 employing the prime notation.

In the operation of the inverter of FIG. 2, if it is assumed that silicon controlled rectifiers 10, 10', 14, and 14' are gated into conductivity by the same gating source, then silicon controlled rectifiers 10 and 14' would be gated on simultaneously and silicon controlled rectifiers 10' and 14 would gated on simultaneously. The output of the inverter would then be a rectangular wave. The same commutation events that ensued in connection with the operation of silicon controlled rectifiers 10 and 14 in FIG. 1 occur in the operation of silicon controlled rectifiers 10 and 14 and 10' and 14' respectively in the circuit of FIG. 2.

Figure 3:
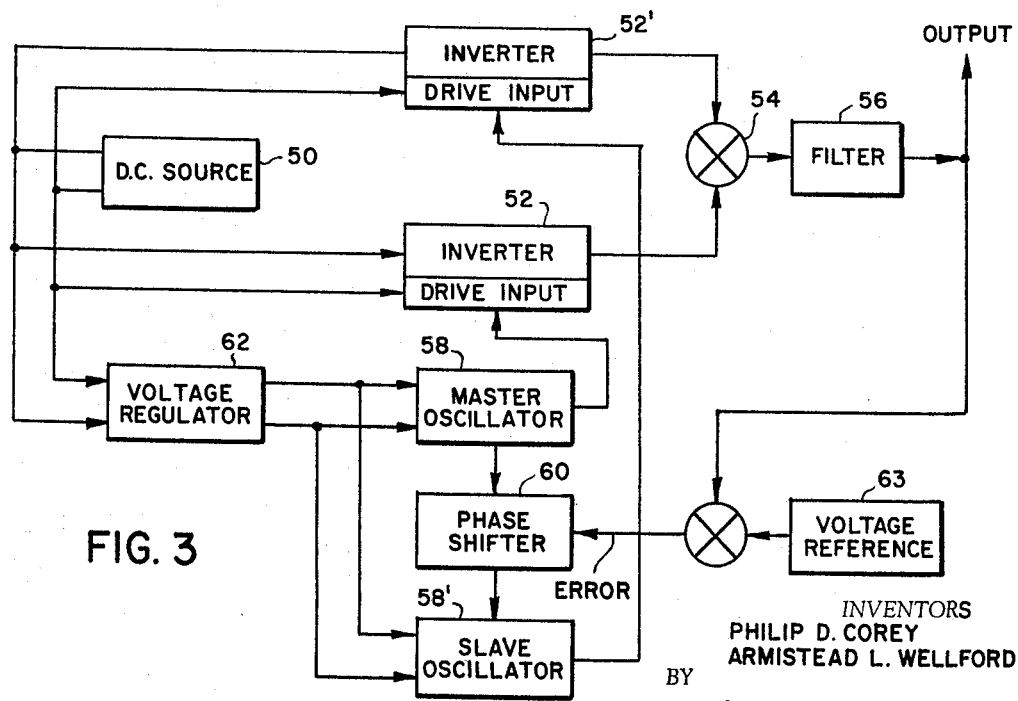
FIG. 3 is a block diagram of an inverter system embodying the inverter of FIG. 2.

In FIG. 3 there is shown an arrangement of an inverter system wherein the circuit of FIG. 2 can be utilized as the inverters therein and wherein voltage regulation can be provided by gating silicon controlled rectifiers 10 and 14, and 10' and 14' respectively by separate like gating sources, there being a phase displacement between the outputs of the respective gating sources which is in accordance with the deviation of the output voltage of the system from a desired voltage.

In the arrangement of FIG. 3, D.C. source 50 is the same as source 2 of the circuits of FIGS. 1 and 2. Inverters 52 and 52' correspond to the two inverters comprising the circuit of FIG. 2. The outputs of these circuits are combined as symbolically depicted in stage 54, the combined output being filtered in a suitable low-pass filter 56 to provide a sinusoidal wave output.

A master oscillator 58 and a slave oscillator 58' provide gating signals to inverters 52 and 52' respectively, a phase shifter 60 responsive to the deviation of the output voltage from a voltage of a reference source 63 determining the degree of phase displacement between the outputs of master oscillator 58 and slave oscillator 58'. Thus, utilizing the master, slave oscillator arrangement of FIG. 3 in conjunction with the circuit of FIG. 2, if it is assumed that there is a phase displacement between the outputs of oscillators 58 and 58', when silicon controller rectifier 10 for example is gated into conductivity, silicon controlled rectifier 10' will not be gated into conductivity for the period of the phase displacement between the oscillators. A voltage is developed across load 20 only for the period that silicon controlled rectifiers 10 and 14' are simultaneously conductive. Similarly, a voltage of the reverse polarity is developed across load 20 only when silicon controlled rectifiers 10' and 14 are simultaneously conductive. Thus in this situation, the output of the circuit of FIG. 2 is a quasi-rectangular wave.

Referring now to FIG. 4, there is shown therein a schematic diagram of master oscillator 58, phase shifter 60 and slave oscillator 58'.

Master oscillator 58 comprises a first transistor 172 having an emitter 174 directly connected to the positive terminal of the regulated D.C. voltage supply as provided by the voltage regulator stage 62 in FIG. 3, a collector 176 connected to the negative terminal of the regulated D.C. supply through a primary winding 180 of transformer 154, the emitter being connected to the junction 181 of the negative terminal of the D.C. supply and primary winding 180 through the series arrangement of resistors 177 and 178, and a base 173 connected to the junction 179 of resistors 177 and 178 through a secondary winding 172 of transformer 154.

A second transistor 190 in oscillator 58 has its emitter connected to emitter 174, its collector 194 connected to junction 181 through a primary windinng 186 of transformer 154 and a base 196 connected to junction 179 through a secondary winding 184 of transformer 154. Transformer 154 is of the saturable type and may suitably be an autotransformer, the core material therein preferably being of a grain oriented magnetic material having a given volt-second characteristic, i.e., the product of the voltage applied thereto and the time required for the cores thereof to go from saturation in one direction to saturation in the opposite direction.

Slave oscillator 58' is essentially similar to master oscillator 58 and accordingly, is also a megnetic coupled square wave multivibrator. However, the transformer 162 in slave oscillator 58' need not be of saturable type. If it is of the saturable type, then the volt-second characteristic of its core material has to greater than that of transformer 154 as will be further explained.

In slave oscillator 58', a first transistor 200 has its emitter 202 connected to the positive terminal of the regulated D.C. supply, its collector 204 connected to the negative terminal of the D.C. supply through a primary winding 208 of transformer 162, emitter 202 being connected to the junction 209 of the negative terminal of the D.C. supply and primary winding 208 through the series arrangement of resistors 216 and 218, and a base 206 connected to the junction 217 of resistors 216 and 218, through a secondary winding 212 of transformer 162.

A second transistor 220 in slave oscillator 58' has its emitter 222 connected to emitter 202, its base 226 connected to junction 217 through a secondary winding 214 of transformer 162 and its collector 224 connected to junction 209 through a primary winding 210 of transformer 162.

A twin cored magnetic amplifier 230 which is an embodiment of the phase shifter 60 of FIG. 3 comprises gate winding 232 and 234 having their respective terminals 233 and 237 connected together, the junction 236 of windings 232 and 234 being connected to base 226 of transistor 220, the other terminals 231 and 235 respectively of gate windings 232 and 234 having connected therebetween the anode to cathode paths of diodes 238 and 240. The nonpolarity dot terminal of a secondary winding 185 of transformer 154 is connected to junction 239 of the cathode of diode 238 and the anode of diode 240 and the polarity dot terminal of secondary winding 185 is connected to base 296 of transistor 200. A control winding of magnetic amplifier 230, (not shown), is connected in the output voltage sensing circuit, there being developed thereacross an error voltage which results from the comparison between the output voltage of the system and a reference voltage of a desired value. Control winding 244 of magnetic amplifier 154 in series arrangement with a resistor 246 is an isolated control winding which has the dual function of slowing the operation of magnetic amplifier 230 and filtering the voltage sensed on the control winding whereby there is provided a well damped voltage regulator response to transients.

Considering the operation of master oscillator 58 and slave oscillator 58' in conjunction with magnetic amplifier 230 including the control winding, normally in the operation of a multivibrator such as that comprising transistors 172 and 190 and saturable transformer 154, transistors 172 and 190 alternately apply the voltage from their D.C. supply, i.e., to primary windings 180 and 186 of transformer 154. Upon the application of such voltage, the voltage divider comprising resistors 177 and 178 biases the base to emitter junctions of both transistors 172 and 190 in such a direction as to render them both conductive. However, any small unbalance causes one transistor to become conductive before the other. If it is assumed that transistor 172 is rendered conductive first, the polarity of winding 182 is such that when transistor 172 conducts, the positive voltage applied at the nonpolarity dot terminal of winding 182 induces a negative voltage at base 173 with respect to the junction 179, thereby increasing the conductivity in transistor 172 and holding it conductive until transformer 154 saturates a constant number of volt-seconds later. While transistor 172 is so biased in the conductive direction, it is to be noted that the reverse polarity occurring in winding 184 is biasing transistor 190 further in the nonconductive direction. When transformer 154 saturates after transistor 172 has been conductive, the base drive on transistor 172 collapses and transistor 190 is substantially immediately rendered conductive. In this manner, transistor 190 supplies the other half of the output cycle of the multivibrator.

In the event that transformer 162 is a saturable transformer, the multivibrator comprising transistors 200 and 220 by itself operates in the same manner as described in connection with the multivibrator comprising transistors 172 and 190. The volt-second characteristic of transformer 162 in the event that it is chosen to be of the saturable type, has to be greater than the volt-second characteristic of transformer 154, whereby the natural frequency of slave oscillator 58' is less than that of master oscillator 58.

Now considering the operation of both oscillators 58 and 58' and the magnetic amplifier 230 coupling therebetween, it is seen that outputs of transistors 172 and 190 of master oscillator 58 are applied to gate windings 232 and 234 respectively of magnetic amplifier 230 through secondary winding 185. The control voltage derived from the comparison between the system output voltage and the reference voltage is generated on the control winding. The polarity dots on the windings of magnetic amplifier 230 indicate the direction of current therethrough to produce positive ampere turns therein and thereby increase the output of the magnetic amplifier.

If it is assumed that transistor 172 of master oscillator 58 and transistor 220 of slave oscillator 58' are concurrently conducting, it is seen that current from the nonpolarity dot terminal of secondary winding 185 is passed through diode 240 and through gate winding 232 to base 226 of transistor 220. Dependent upon the volt-second characteristic of the core material of magnetic amplifier 230, when magnetic amplifier 230 saturates due to the current through winding 232, the sudden drop in the impedance of winding 232 and the consequent rise in potential at base 226 rapidly renders transistor 220 nonconductive, and by transformer action, transistor 200 is consequently rapidly rendered conductive.

It has been stated above that transformer 154 is of the saturable type but that transformer 162 may be of the unsaturable type. If transformer 162 is chosen to be of the saturable type, it has to have an $NAB_s$ product which is appreciably greater than the $NAB_s$ product of transformer 154, the difference being about 25 percent. The natural frequency of slave oscillator 58' is consequently appreciably less than that of master oscillator 58. The volt-second characteristic of the core material of magnetic amplifier 230 and the error voltage generated in the control winding determines the amount of phase displacement between the outputs of oscillator 58 and oscillator 58'.

It is to be further noted that core material of magnetic amplifier 230 has to be chosen to have a volt-second characteristic whereby its time of switching from saturation in one direction to saturation in the other direction cannot exceed the time of a half cycle of output from oscillator 58. If its volt-second characteristic were so chosen whereby its saturation time could be longer than the period of such half cycle, then in the event, of course, that transformer 162 were chosen to be of the saturable type, the frequency of the output of oscillator 58' would be its natural frequency as determined by the volt-second characteristic of transformer 162 and the value of the regulated D.C. supply voltage. In this type situation, oscillator 58 could not control the output frequency of oscillator 58'.

Accordingly, with the arrangement of master oscillator 58, slave oscillator 58' and the magnetic amplifier 230 coupling therebetween, the phase difference permitted between the outputs of oscillator 58 and oscillator 58' is up to a maximum of 180°. It is, of course, appreciated that if volt-second characteristic of transformer 162, in the event that it were chosen to be of the saturable type, were equal to or less than the volt-second characteristic of transformer 154, oscillator 58' would have a natural output frequency independent of the frequency of oscillator 58. If magnetic amplifier 230 were eliminated from the circuit, and transformer 162 were either of the nonsaturable type or of the saturable type and having a greater volt-second characteristic than that of transformer 154, the output of oscillator 58' would be in synchronism with the output of oscillator 58 with no phase difference between the outputs. Diodes 238 and 240 effect high "amplistat gain" in magnetic amplifier 230.

The arrangement comprising oscillators 58 and 58" and magnetic amplifier 230 is characterized by several inherent advantages. For example, one advantage resides in the fact that very low power is required from the phase shift signal control source, i.e., the voltage across the control winding, due to the high "amplistat gain" of magnetic amplifier 230. Another advantage is that the control winding can be designed to "match" a very wide range of signal source impedances. A further advantage is that the phase displacement between the outputs of master oscillator 58 and slave oscillator 58' can be made to be the algebraic sum of several control signals by merely winding several separate control windings on magnetic amplifier 230.

While there have been shown several embodiments of this invention, it will, of course, be understood that it is not intended to be limited thereto since many modifications both in the circuit arrangements and in the instrumentalities employed therein may be made and it is therefore contemplated by the appended claims to cover any such modification as falls within the true spirit and scope of the invention.

What is claimed as new and desired to be secured by Letters Patent of the United States is:

1. A circuit for converting the output of a D.C. source to an A.C. output comprising a series arrangement of first and second gate controlled rectifiers and a center-tapped inductance disposed theerbetween, said series arrangement being connected across said source, a first capacitance connected across said first gate controlled rectifier and half of said inductance, a second capacitance connected across said second gate controlled rectifier and the other half of said inductance and signal generating means in circuit with said gate controlled rectifiers for gating said gate controlled rectifiers into conductivity alternately during successive half cycles of output from said signal generating means, twice the source voltage appearing across said inductance by autotransformer action when a gate controlled rectifier is rendered conductive and in a polarity to render the previously conducting gate controlled rectifier nonconductive and means for developing said A.C. output between the center tap of said center-tapped inductance and said D.C. source.

2. A circuit as defined in claim 1 and further included voltage clamping means coupled across said inductance.

3. A circuit as defined in claim 2 wherein said clamping means comprises first and second diodes connected across the separate halves of said inductance.

4. A circuit as defined in claim 2 and further including first and second series arrangements of a first resistance and a third capacitance and a second resistance and a fourth capacitance respectively connected across said first and second gate controlled rectifiers.

5. A circuit as defined in claim 4 and further including a third diode connected across said first gate controlled rectifier and one half of said inductance and a fourth diode connected across said second gate controlled rectifier and the other half of said inductance, said third and fourth diodes enabling the return of energy to said source when the load of said circuit is a lagging power factor load.

6. A circuit for converting the output of a D.C. source to an A.C. output comprising first and second inverters, a load circuit, each of said inverters comprising a series arrangement of first and second gate controlled rectifiers and a center-tapped inductance disposed therebetween, each of said series arrangements being connected across said source, a first capacitance connected across said first gate controlled rectifier and half of said inductance, a second capacitance connected across said second gate controlled rectifier and the other half of said inductance, and signal generating means in circuit with said gate controlled rectifiers for concurrently gating the first gate controlled rectifier of the first inverter and the second gate controlled rectifier of the second inverter into conductivity and for concurrently gating the second gate controlled rectifier of the first inverter and the first gate controlled rectifier of the second inverter into conductivity alternately during successive half cycles of output from said signal generating means, twice the source voltage appearing across an inductance by auto-transformer action when a gate controlled rectifier of an inverter is rendered conductive and in a polarity to render nonconductive the previously conducting gate controlled rectifier of said last-named inverter and means for developing said A.C. output across said load circuit comprising means for coupling said load circuit between the center taps of said inductances.

7. A circuit as defined in claim 6 and further including clamping means coupled across each of said inductances.

8. A circuit as defined in claim 7 wherein each of said clamping means comprises first and second diodes connected across the respective separate halves of each of said inductances.

9. A circuit as defined in claim 6 and further including first and second series arrangements of a first resistance and a third capacitance and a second resistance and a fourth capacitance respectively connected across each of said first and second gate controlled rectifier combinations.

10. A circuit as defined in claim 9 and further including third diodes connected across the first gate controlled rectifier and the half of the inductance of each inverter respectively and fourth diodes connected across the second gate controlled rectifier and the other half of the inductance of each inverter respectively, said third and fourth diodes enabling the return of energy to said source when the load of said circuit is a lagging power factor load.

11. A circuit for converting the output of a D.C. source to an A.C. output comprising first and second inverters, a load circuit, each of said inverters comprising a series arrangement of first and second gate controlled rectifiers and an associated center-tapped inductance disposed therebetween, each of said series arrangements being connected across said source, means for coupling said load circuit between the center taps of said inductances, a first capacitance connected across each of said first gate controlled rectifiers and half of said inductance associated therewith, a second capacitance connected across each of said second gate controlled rectifiers and the other half of said inductance associated therewith, first and second signal generating means having like frequencies in circuit with the gate controlled rectifiers of said first and second inverters respectively for gating into conductivity the gate controlled rectifiers comprising an inverter alternately during successive half cycles of output from a signal generating means, phase shifting means for coupling the output of the first signal generating means to the second signal generating means to produce like frequency outputs from said signal generating means but displaced in phase with respect to each other an amount in accordance with a voltage applied to said phase shifting means, a voltage being developed across said load when the first gate controlled rectifier of the first inverter and second gate controlled rectifier of the second inverter are concurrently conductive and when the second gate controlled rectifier of the first inverter and the first gate controlled rectifier of the second inverter are concurrently conductive, twice the source voltage appearing across an inductance by auto-transformer action when a gate controlled rectifier of an inverter is rendered conductive and in a polarity to render nonconductive the previously conducting gate controlled rectifier of said last-named inverter.

12. A circuit as defined in claim 11 and further including voltage clamping means coupled across each of said inductances.

13. A circuit as defined in claim 12 wherein each of said clamping means comprises first and second diodes connected across the respective separate halves of each of said inductances.

14. A circuit as defined in claim 11 and further including first and second series arrangements of a first resistance and a third capacitance and a second resistance and a fourth capacitance respectively connected across each of said first and second gate controlled rectifier combinations.

15. A circuit as defined in claim 14 and further including third diodes connected across the first gate controlled rectifier and one half of the inductance of each inverter respectively and fourth diodes connected across the second gate controlled rectifier and the other half of the inductance of each inverter respectively, said third and fourth diodes enabling the return of energy to said source when the load of said circuit is a lagging power factor load.

16. A circuit for converting the output of a D.C. source to an A.C. output comprising first and second inverters, a load circuit, each of said inverters comprising a series arrangement of first and second gate controlled rectifiers and an associated center-tapped inductance disposed therebetween, means for coupling each of said series arrangements across said source, a respective commutating capacitance connected across each of said gate controlled rectifiers and a respective center-tapped portion of the inductance associated therewith, pump-back diodes coupled across each of said commutating capacitors, means for coupling said load circuit between the center taps of said inductances and means for gating said gate controlled rectifiers into conductivity for developing an A.C. output across said load circuit.

References Cited by the Examiner

UNITED STATES PATENTS

| | | | |
|---|---|---|---|
| 3,010,062 | 11/1961 | Van Emden | 321—45 X |
| 3,103,616 | 9/1963 | Cole et al. | 321—45 |

JOHN F. COUCH, *Primary Examiner.*

LLOYD McCOLLUM, *Examiner.*

A. J. GAJARSA, M. WACHTELL, *Assistant Examiners.*